(12) United States Patent
Kim et al.

(10) Patent No.: US 12,320,714 B2
(45) Date of Patent: Jun. 3, 2025

(54) CMOS TEMPERATURE SENSOR AND OPERATING METHOD THEREOF

(71) Applicant: SOLIDVUE, INC., Suwon-si (KR)

(72) Inventors: Seong Jin Kim, Ulsan (KR); Chang Yong Shin, Ulsan (KR)

(73) Assignee: SOLIDVUE, INC., Suwon-si (KR)

( * ) Notice: Subject to any disclaimer, the term of this patent is extended or adjusted under 35 U.S.C. 154(b) by 870 days.

(21) Appl. No.: 17/528,127

(22) Filed: Nov. 16, 2021

(65) Prior Publication Data

US 2022/0163402 A1 May 26, 2022

(30) Foreign Application Priority Data

Nov. 20, 2020 (KR) .................. 10-2020-0156537

(51) Int. Cl.
*G01K 7/01* (2006.01)
*G01K 7/34* (2006.01)

(52) U.S. Cl.
CPC ............. *G01K 7/01* (2013.01); *G01K 7/34* (2013.01)

(58) Field of Classification Search
CPC .................................. G01K 7/01; G01K 7/34
See application file for complete search history.

(56) References Cited

U.S. PATENT DOCUMENTS

| | | | | |
|---|---|---|---|---|
| 6,078,208 A | * | 6/2000 | Nolan | G01K 7/01 |
| | | | | 327/512 |
| 2013/0272341 A1 | * | 10/2013 | Lee | G01K 7/34 |
| | | | | 374/184 |
| 2018/0073938 A1 | * | 3/2018 | Buter | G01K 7/34 |

FOREIGN PATENT DOCUMENTS

| | | | | |
|---|---|---|---|---|
| CN | 107817060 A | * | 3/2018 | ............... G01K 7/34 |
| CN | 209841222 U | * | 12/2019 | |

* cited by examiner

*Primary Examiner* — Mirellys Jagan
(74) *Attorney, Agent, or Firm* — Studebaker Brackett PLLC

(57) ABSTRACT

Disclosed are a CMOS temperature sensor for measuring a temperature and an operating method thereof. According to an embodiment, the CMOS temperature sensor for measuring the temperature may include a readout circuit that outputs a readout value by comparing a voltage value at a first end of a capacitor charging a charge based on a proportional current proportional to a temperature with an inverse proportional voltage inversely proportional to the temperature or comparing a voltage value at a second end of the capacitor formed at the other side of the first end with a ground voltage; and a control unit that determines a temperature based on an oscillation period of the readout value output from the readout circuit.

16 Claims, 14 Drawing Sheets

CMOS TEMPERATURE SENSOR AND OPERATING METHOD THEREOF

CROSS-REFERENCE TO RELATED APPLICATIONS

This application claims the priority of Korean Patent Application No. 10-2020-0156537 filed on Nov. 20, 2020, in the Korean Intellectual Property Office, the disclosure of which is incorporated herein by reference.

BACKGROUND OF THE INVENTION

Field of the Invention

The present disclosure relates to a CMOS temperature sensor and an operating method thereof. More particularly, the present disclosure relates to a CMOS temperature sensor based on an oscillator and an operating method thereof.

Description of the Related Art

In general, a temperature sensor fabricated in a CMOS process may be fabricated using a band gap reference signal which is not changed according to a temperature using a SUBSTRATE PNP transistor and a BASE-EMITTER voltage which is linearly changed according to a temperature. However, an accurate temperature coefficient, such as the SUBSTRATE PNP transistor varies due to a process change so that the accuracy of the temperature sensor may be lowered, and it is general to increase the accuracy of the temperature sensor through a correction to constantly adjust the BASE-EMITTER voltage at a certain temperature.

In the case of a conventional CMOS temperature sensor, a sigma-delta analog digital converter (ADC)-based readout circuit was used, and the conventional CMOS temperature sensor using the sigma-delta ADC-based readout circuit secured a certain advantage in resolution to accuracy, but had a limit to high power consumption and a large area.

Therefore, it has been required to develop a technique for the CMOS temperature sensor having advantages in power consumption and area efficiency of the circuit.

The above-described technical configuration is the background art for helping in the understanding of the present invention, and does not mean a conventional technology widely known in the art to which the present invention pertains.

SUMMARY OF THE INVENTION

An object of the present disclosure is to provide a CMOS temperature sensor for measuring a temperature.

Another object of the present disclosure is to provide a CMOS temperature sensor for measuring a temperature based on an oscillation period of an output signal of a readout circuit.

Yet another object of the present disclosure is to provide a CMOS temperature sensor for measuring a temperature based on an oscillation period of an output value of a readout circuit using a flipped capacitor.

According to an aspect of the present disclosure, there is provided a CMOS temperature sensor for measuring a temperature including a readout circuit that outputs a readout value by comparing a voltage value at a first end of a capacitor charging a charge based on a proportional current proportional to a temperature with an inverse proportional voltage inversely proportional to the temperature or comparing a voltage value at a second end of the capacitor formed at the other side of the first end with a ground voltage; and a control unit that determines a temperature based on an oscillation period of the readout value output from the readout circuit.

The CMOS temperature sensor may further include a bias circuit that supplies the proportional current generated by applying an proportional voltage inversely inverse proportional linearly to the temperature and the proportional current generated by applying the inverse proportional voltage to a bias resistor.

According to another aspect of the present disclosure, there is provided a method for measuring a temperature by a CMOS temperature sensor comprising the steps of acquiring a proportional current proportional to a temperature and an inverse proportional voltage from a predetermined bias circuit; outputting a readout value by comparing a voltage value at a first end of a capacitor charging a charge based on the proportional current with an inverse proportional voltage inversely proportional to the temperature or comparing a voltage value at a second end of the capacitor formed at the other side of the first end with a ground voltage after a predetermined threshold time elapses; identifying an oscillation period of the output readout value; and determining a temperature based on the identified oscillation period.

According to yet another aspect of the present disclosure, there is provided a computer readable recording medium in which a program is stored to perform a method for measuring a temperature by a CMOS temperature sensor, the method comprising the steps of acquiring a proportional current proportional to a temperature and an inverse proportional voltage inversely proportional to the temperature from a predetermined bias circuit; outputting a readout value by comparing a voltage value at a first end of a capacitor charging a charge based on the proportional current proportional to the temperature with the inverse proportional voltage inversely proportional to the temperature or comparing a voltage value at a second end of the capacitor formed at the other side of the first end with a ground voltage; identifying an oscillation period of the output readout value after a predetermined threshold time elapses; and determining a temperature based on the identified oscillation period.

According to an embodiment, it is possible to accurately measure a temperature.

According to an embodiment, it is possible to provide a CMOS temperature sensor with improved power and area efficiency.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
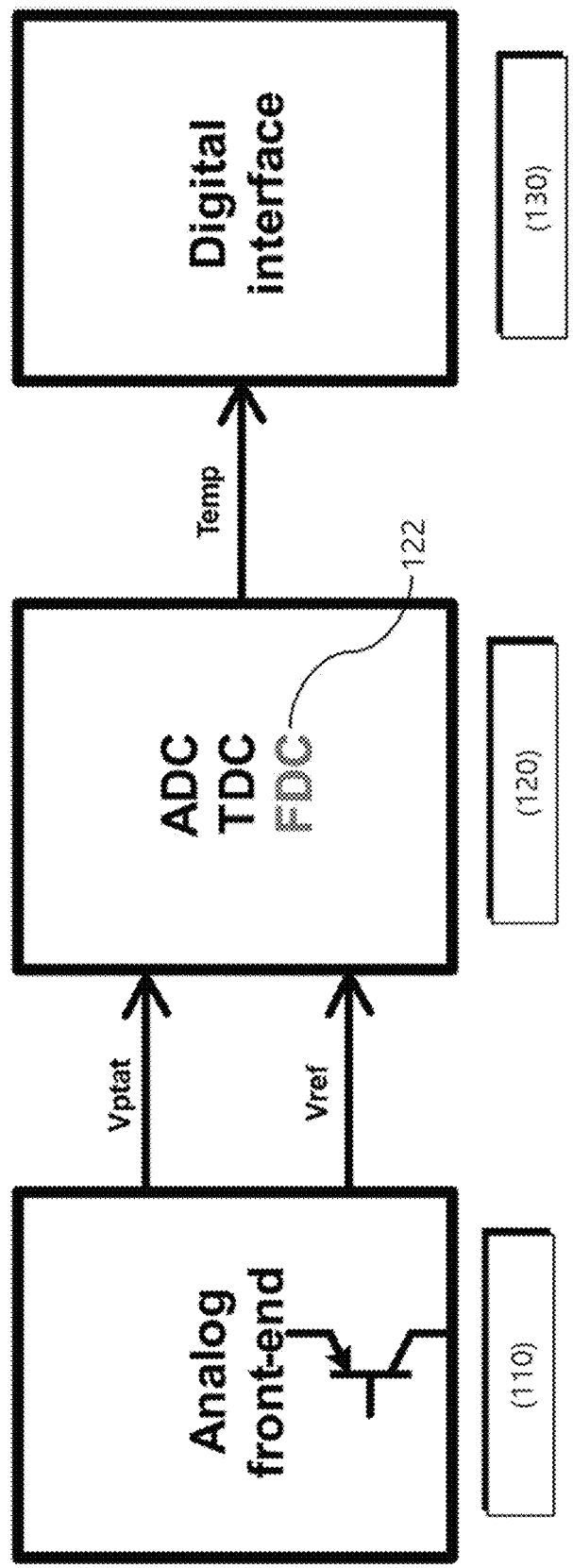
FIG. 1 is a diagram for schematically describing an operation of a temperature sensor according to an embodiment.

Terms used in the present disclosure will be described in brief and the present disclosure will be described in detail.

Terms used in the present disclosure adopt general terms which are currently widely used as possible by considering functions in the present disclosure, but the terms may be changed depending on an intention of those skilled in the art, a precedent, emergence of new technology, etc. Further, in a specific case, a term which an applicant arbitrarily selects is present and in this case, a meaning of the term will be disclosed in detail in a corresponding description part of the invention. Accordingly, a term used in the present disclosure should be defined based on not just a name of the term but a meaning of the term and contents throughout the present disclosure.

Further, throughout the specification, unless explicitly described to the contrary, when a part "comprises" a component, it will be understood to imply the inclusion of stated elements but not the exclusion of any other elements. In addition, terms of "unit", "module", and the like disclosed herein mean a unit that processes at least one function or operation and this may be implemented by hardware or software or a combination of hardware and software.

An embodiment of the present disclosure will be described more fully hereinafter with reference to the accompanying drawings so as to be easily implemented by those skilled in the art. However, the present disclosure can be realized in various different forms, and is not limited to the embodiments described herein. Accordingly, the drawings and description are to be regarded as illustrative in nature and not restrictive. Like reference numerals designate like elements throughout the specification.

FIG. 1 is a diagram for schematically describing an operation of a temperature sensor according to an embodiment.

According to an embodiment, the temperature sensor 120 is electrically connected to an analog front-end circuit 110 representing a specific electrical characteristic according to a temperature and may output a temperature Temp based on voltages $V_{PTAT}$ and $V_{REF}$ acquired from the analog front-end circuit 110. According to an embodiment, $V_{REF}$ may be a reference voltage output from a band gap circuit outputting constantly a voltage regardless of a temperature variation.

According to an embodiment, the temperature sensor may be classified into an analog to digital converter (ADC) type, a time to digital converter (TDC) type, and a frequency to digital converter (FDC) 122 type. The temperature sensors according to the types may acquire variables (e.g., $V_{PTAT}$ and $V_{REF}$) representing a specific electrical characteristic according to a temperature variation from the analog front-end circuit 110 and identify the temperature using the acquired variables. The temperature sensors transmit identified temperature information to a digital interface 130 connected with the temperature sensor so as to allow electronic devices to use temperature values.

Figure 2:
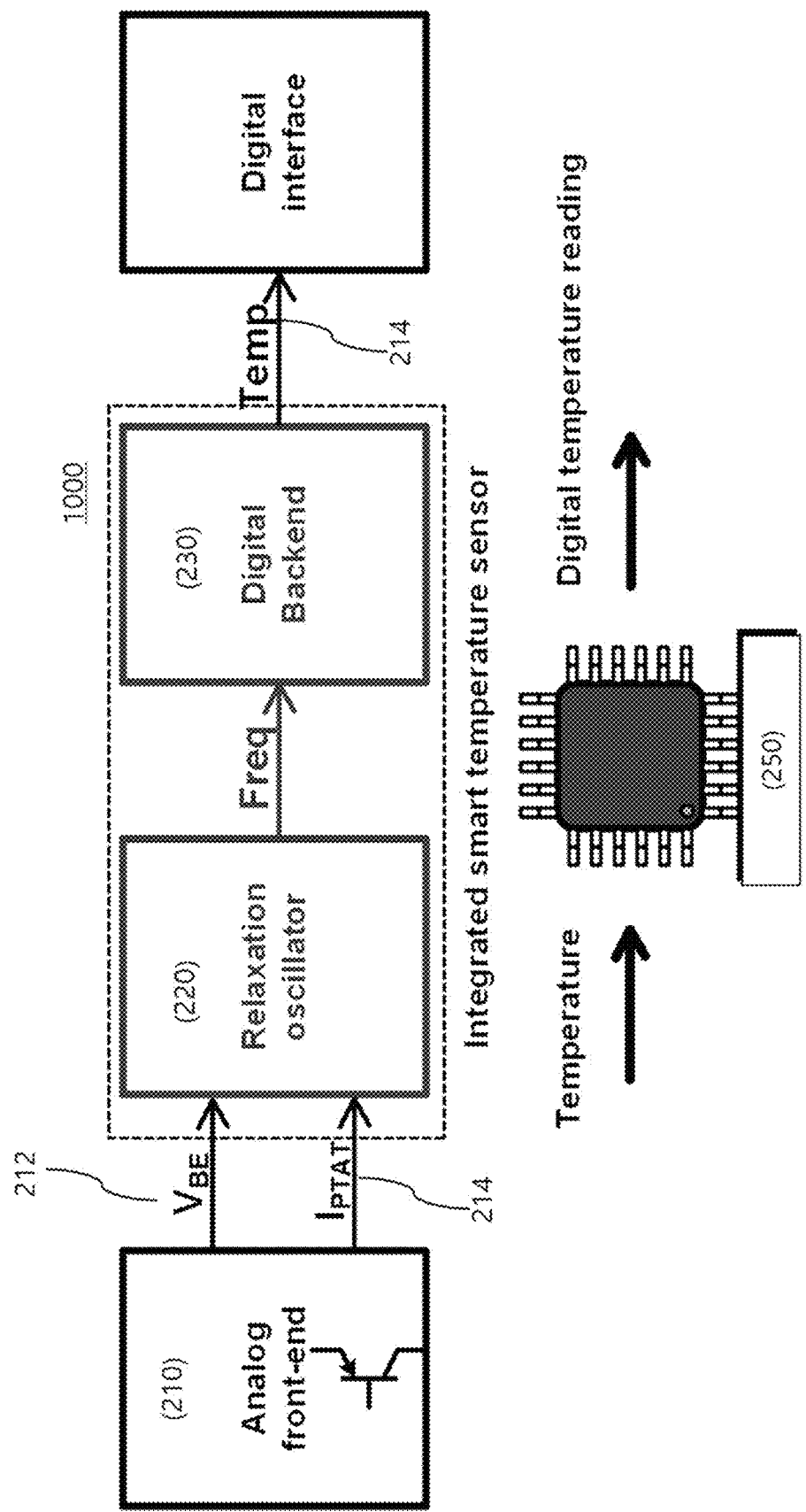
FIG. 2 is a diagram for schematically describing a structure of a CMOS temperature sensor according to an embodiment of the present disclosure.

FIG. 2 is a diagram for schematically describing a structure of a CMOS temperature sensor according to an embodiment of the present disclosure.

A temperature sensor 1000 according to the present disclosure may include a relaxation oscillator 220 having a structure provided so that an output value is oscillated and a digital backend 230 determining temperature information from oscillation period and frequency. The temperature sensor 1000 according to the present disclosure may acquire variables $V_{BE}$ 212 and $I_{PTAT}$ 214 representing negative and positive properties according to a temperature variation from an analog front end 210 and determine a temperature 214 using the frequency and oscillation period of the output value of the relaxation oscillator output using the acquired variables.

According to an embodiment, the $V_{BE}$ 212 may mean a voltage variable that decreases at a predetermined slope as the temperature increases and the $I_{PTAT}$ 214 may mean a current variable that increases at a predetermined slope as the temperature increases. As described above, the variables $V_{BE}$ 212 and $I_{PTAT}$ 214 may be acquired from the bias circuit which may be electrically connected with the temperature sensor. The relaxation oscillator 220 and the digital backend 230 determining the temperature information from the oscillation period and frequency according to the present disclosure may also be provided as a single smart temperature sensor module 250.

Figure 3:
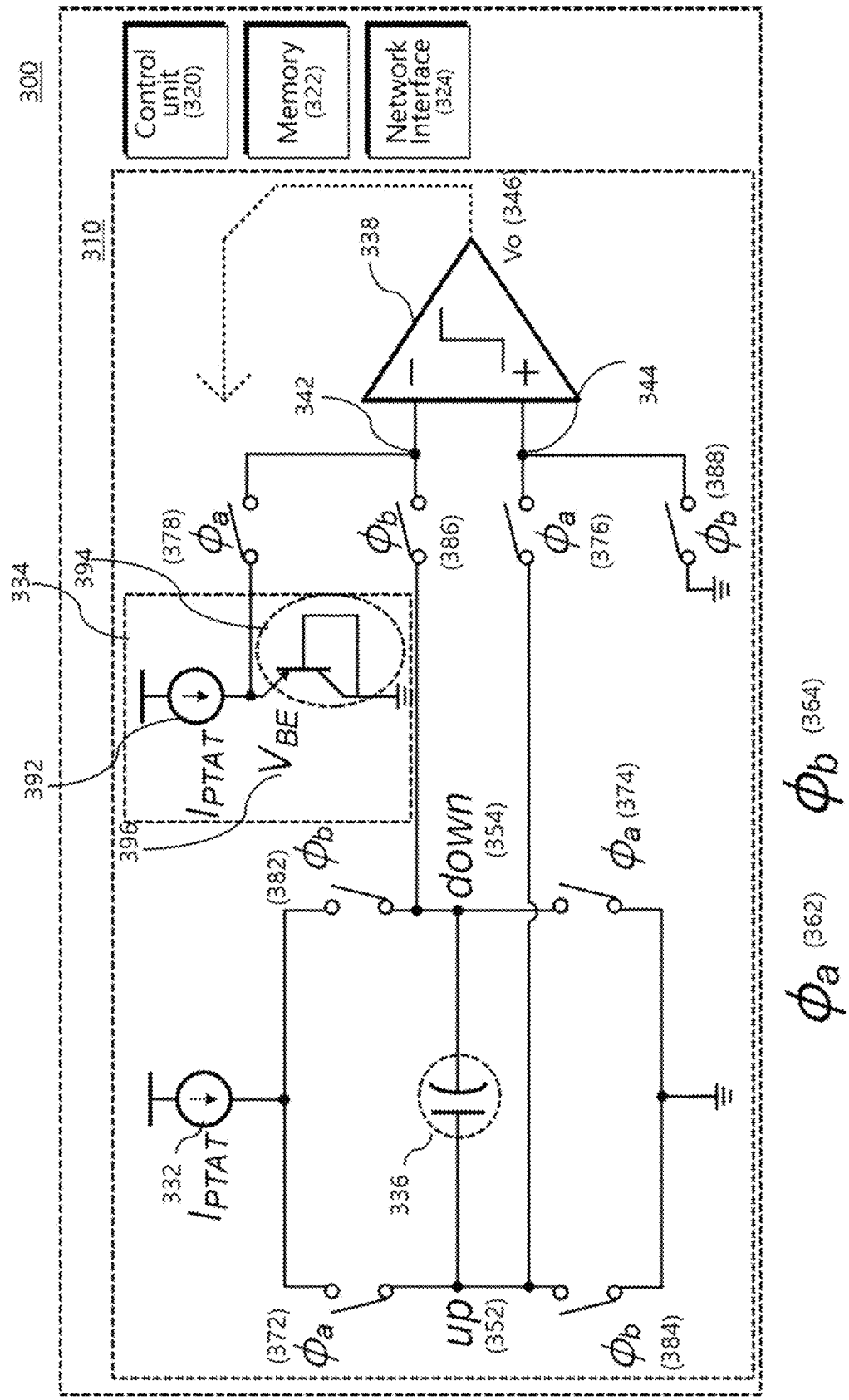
FIG. 3 is a diagram illustrating a structure of a CMOS temperature sensor according to an embodiment.

FIG. 3 is a diagram illustrating a structure of a CMOS temperature sensor according to an embodiment.

According to an embodiment, a CMOS temperature sensor 300 may include a readout circuit 310 and a control unit 320. However, it is not limited to the above-described configuration, and the CMOS temperature sensor may also further include components such as a memory 322 and a network interface 324. For example, the CMOS temperature sensor 300 compares voltage magnitudes of input ends of a comparator in the readout circuit to determine an output value of the readout circuit and measure the temperature based on the oscillation period of the output value.

The readout circuit 310 is provided with the relaxation oscillator-based structure and may compare read and compare the magnitudes of input end voltages inputted to two input ends of the comparator in the readout circuit. More specifically, the readout circuit 310 may output a readout value by comparing a voltage value in a first end UP 352 of a capacitor 336 charging a charge based on a proportional current 332 proportional to a temperature with an inverse proportional voltage $V_{BE}$ 396 inversely proportional to the temperature or comparing a voltage value in a second end DOWN 354 of the capacitor formed at the other side of the first end UP 352 with a ground voltage (for example, a ground voltage connected through an eighth MOS transistor 388).

According to an embodiment, the readout circuit 310 may include a current supply unit 332 and an inverse proportional voltage supply unit 334. The current supply unit 332 may provide a proportional current $I_{PTAT}$ that increases at a predetermined ratio as the temperature increases. According to an embodiment, the inverse proportional voltage supply unit 334 may generate a mirroring current 392 by mirroring the proportional current of the current supply unit 332, and generate an inverse proportional voltage $V_{BE}$ 396 using the generated mirroring current. According to an embodiment, the inverse proportional voltage supply unit 334 may include a mirroring current supply unit 392 and a bipolar junction transistor (BJT) 394. A collector and a base of the bipolar junction transistor (BJT) 394 are connected to a ground voltage, an emitter thereof is connected to the mirroring current supply unit 392, and as the mirroring current supply unit 392 obtains the mirroring current, a voltage $V_{BE}$ as the inverse proportional voltage may be generated in a base emitter end in the bipolar junction transistor 394.

Further, according to an embodiment, the readout circuit 310 may further include a capacitor 336 and a comparator 338. According to an embodiment, the capacitor 336 may repeat an operation of charging up to the inverse proportional voltage or charging up to the ground voltage after reversing the voltage charged in the capacitor according to the oscillation period based on a switching operation of a plurality of MOS transistors. For example, the capacitor 336 may include a first end 352 corresponding to one side node and a second end 354 which is a node formed at the other side of the first end 352.

Further, the comparator 338 includes a first input end 344 (e.g., V+) and a second input end 342 (e.g., V−) and may output a readout value (Vo) 346 by comparing voltages applied to the first input end and the second input end according to a switching operation of the plurality of MOS transistors. For example, the comparator 338 may output a first readout value corresponding to a LOW signal when the voltage of the first input end 344 is smaller than the voltage of the second input end 342 and output a second readout value corresponding to a HIGH signal when the voltage of the first input end 344 is larger than the voltage of the second input end 342.

For example, the output value of the comparator 338 may correspond to the output value of the readout circuit 310. According to an embodiment, the readout circuit 310 according to the present disclosure uses the output value of the readout circuit for the switching operation of the readout circuit, thereby achieving high power efficiency without separate clock generation. According to an embodiment, when the first readout value is output from the readout circuit 310, based on the switching operation of the plurality of MOS transistors, the first input end 344 may be connected to a first end 352 of the capacitor and the second input end 342 may be connected to the inverse proportional voltage supply unit 334. According to another embodiment, when the second readout value is output from the readout circuit 310, based on the switching operation of the plurality of MOS transistors, the first input end 344 may be connected to a ground voltage and the second input end 342 may be connected to a second end 354 of the capacitor 336.

Further, according to an embodiment, the readout circuit 310 may include a first MOS transistor 372 connecting the proportional current supply unit 332 and the first end 352 when the first readout value is output from the readout circuit 310, a second MOS transistor 374 connecting the second end 354 and the ground voltage when the first readout value is output from the readout circuit 310, a third MOS transistor 376 connecting the first end 352 and the first input end 344 when the first readout value is output from the readout circuit 310, and a fourth MOS transistor 378 connecting the second input end 342 and the inverse proportional voltage supply unit 334 when the first readout value is output from the readout circuit 310. According to an embodiment, the first to fourth MOS transistors may configure a first MOS transistor group 362.

That is, the first MOS transistor group according to an embodiment may be short-circuited using the first readout value as a switching control signal when the output value of the readout circuit 310 is output as the first readout value (e.g., low signal). Further, according to an embodiment, the first MOS transistor group 362 may be opened using the second readout value as the switching control signal.

Further, according to an embodiment, the readout circuit 310 may include a fifth MOS transistor 382 connecting the proportional current supply unit 332 and the second end 354 when the second readout value is output from the readout circuit, a sixth MOS transistor 384 connecting the first end 352 and the ground voltage when the second readout value is output from the readout circuit 310, a seventh MOS transistor 386 connecting the second end 354 and the second input end 342 when the second readout value is output from the readout circuit 310, and an eighth MOS transistor 388 connecting the first input end 344 and the ground voltage when the second readout value is output from the readout circuit 310. The fifth to eighth MOS transistors may configure a second MOS transistor group 364.

That is, the second MOS transistor group 364 according to an embodiment may be short-circuited using the second readout value as a switching control signal when the output value of the readout circuit 310 is output as the second readout value (e.g., high signal). Further, according to an embodiment, the second MOS transistor group 364 may be opened using the first readout value as the switching control signal.

According to an embodiment, the control unit 320 may determine the temperature based on the oscillation period of the readout value output from the readout circuit. According to an embodiment, the control unit 320 may include at least one processor. For example, the control unit 320 may execute one or more instructions stored in the memory 322 to control the operation of the readout circuit or measure the temperature based on the readout value output from the readout circuit 310.

More specifically, the control unit 320 may determine a first temperature variable based on an oscillation period of the readout value output from the readout circuit, a capacity of the capacitor, and a resistance value of the bias resistor. In addition, the control unit 320 may determine a ratio coefficient on a ratio of an inverse proportional temperature coefficient of an inverse proportional voltage inversely proportional linearly to the temperature and a proportional temperature coefficient of a differential voltage according to a base emitter voltage difference between bipolar junction transistors inversely proportional linearly to the temperature in the bias circuit. In addition, the control unit 320 may determine a second temperature variable based on the first temperature variable and the ratio coefficient and determine the temperature by inputting the second temperature variable to a linear function generated by linearly matching a change range of the second temperature variable with a predetermined absolute temperature range.

Further, according to an embodiment, the control unit 320 may also determine the temperature based on the oscillation period of the readout value outputted from the readout circuit after a predetermined threshold time elapses.

Figure 4:
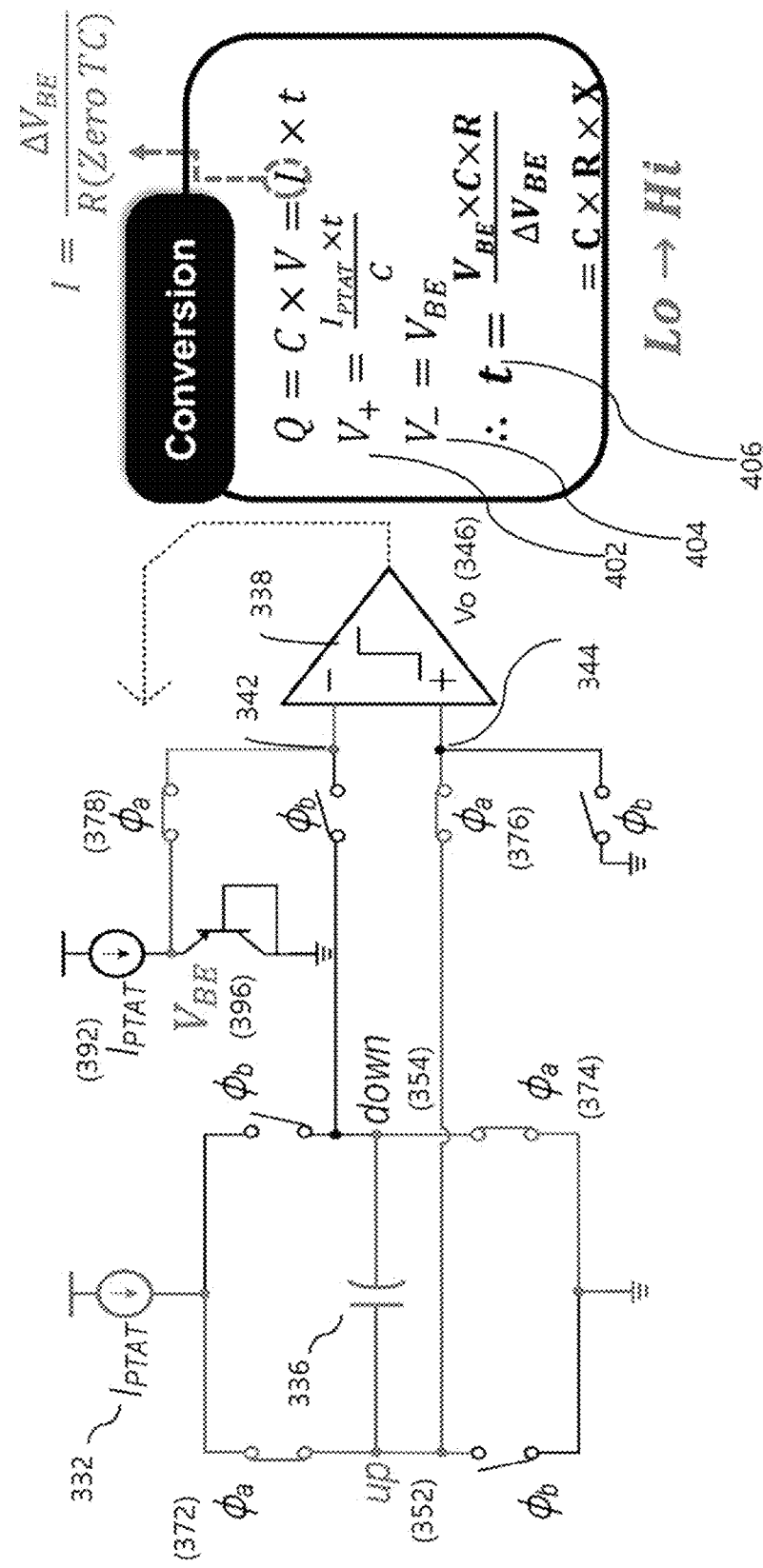
FIG. 4 is a diagram for describing an operation of a CMOS temperature measuring sensor when a first MOS transistor group is short-circuited according to an embodiment.

FIG. 4 is a diagram illustrating an operation of a CMOS temperature measuring sensor when a first MOS transistor group is short-circuited according to an embodiment.

Referring to FIG. 4, an operation of the CMOS temperature sensor will be described in detail when MOS transistor switches included in the first MOS transistor group 362 are short-circuited. According to an embodiment, switches of the first MOS transistor 372, the second MOS transistor 374, the third MOS transistor 376, and the fourth MOS transistor 378 included in the first MOS transistor group 362 may be short-circuited using the first readout value as the switch control signal when the output value 346 of the readout circuit 310 is output as the first readout value (e.g., low signal).

According to an embodiment of the present disclosure, when the first readout value is output from the readout circuit, the state of the readout circuit is defined as a phase A state, and in the phase A state, MOS transistor switches in the first MOS transistor group 362 are short-circuited and MOS transistor switches in the second MOS transistor group 364 may be opened.

Accordingly, the proportional current $I_{PTAT}$ may be transmitted to the capacitor 336 through the first MOS transistor 372. Further, when the first readout value is output from the readout circuit, the fourth MOS transistor is also short-circuited, and the inverse proportional voltage $V_{BE}$ supplied from the inverse proportional voltage supply unit may be provided to the second input end 342 of the comparator. Accordingly, a voltage V− 404 applied to the second input end 342 may have a value $V_{BE}$ as a voltage between the base emitters of the bipolar junction transistor.

When a charge amount of the capacitor is represented by Q=C*V and replaced with Q=I*T, a current I flowing in the capacitor is $I_{PTAT}$, and $I_{PTAT}$ may correspond to a value obtained by dividing a difference value $V_{BE}2-V_{BE}1$ between base emitter voltages of two bipolar junction transistors in the bias circuit by a bias resistor in the bias circuit ($I_{PTAT}=(V_{BE}2-V_{BE}1)/R=\Delta V_{BE}/R$). $\Delta V_{BE}$ may be a proportional voltage that proportionally increases according to a temperature. Accordingly, a voltage V+ 402 represented at the first input end of the comparator is a potential difference to a second end (the second end is connected to a ground through t the short-circuited second MOS transistor 374) from the first end of the capacitor, and may be represented by ($I_{PTAT}$*t)/C. While the readout circuit is in a phase A state, a time t 406 when the readout value output from the readout circuit is maintained may be defined as an inverse proportional voltage value $V_{BE}*C*R/\Delta V_{BE}$ or C*R*X provided from the inverse proportional voltage supply unit. Here, X corresponds to $V_{BE}/\Delta V_{BE}$ and may mean a first temperature variable representing a characteristic changed according to a temperature of the bipolar junction transistor. The control unit of the CMOS temperature sensor determines a second temperature variable using a first temperature variable and a predetermined ratio coefficient as described below, and may determine a temperature by matching the second temperature variable with a linear function.

Figure 5:
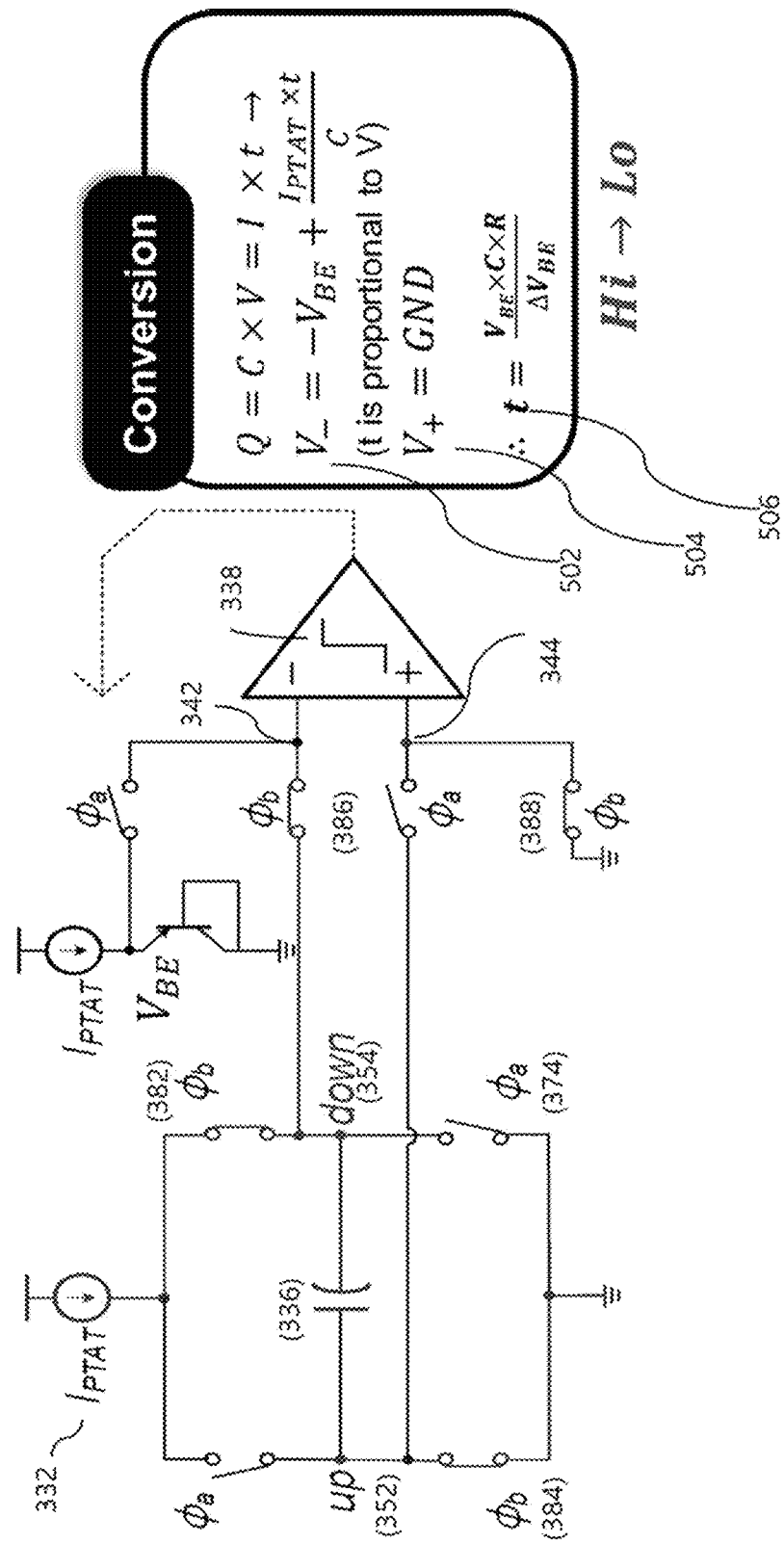
FIG. 5 is a diagram for describing an operation of a CMOS temperature measuring sensor when a second MOS transistor group is short-circuited according to an embodiment.

FIG. 5 is a diagram illustrating an operation of a CMOS temperature measuring sensor when a second MOS transistor group is short-circuited according to an embodiment.

Referring to FIG. 5, an operation of the CMOS temperature sensor will be described in detail when MOS transistor switches included in the second MOS transistor group 364 are short-circuited. According to an embodiment, switches of the fifth MOS transistor 382, the sixth MOS transistor 384, the seventh MOS transistor 386, and the eighth MOS transistor 388 included in the second MOS transistor group 364 may be short-circuited using the second readout value as the switch control signal when the output value 346 of the readout circuit 310 is output as the second readout value (e.g., high signal).

According to an embodiment of the present disclosure, when the second readout value is output from the readout circuit, the state of the readout circuit is defined as a phase B state, and in the phase B state, MOS transistor switches in the second MOS transistor group 364 are short-circuited and MOS transistor switches in the first MOS transistor group 362 may be opened. Accordingly, the proportional current $I_{PTAT}$ 332 is transmitted to the second end of the capacitor 336 through the fifth MOS transistor 382 and the first end 352 of the capacitor is connected to the ground through the sixth MOS transistor 384.

Further, the first input end 344 of the comparator 338 is connected to the ground through the eighth MOS transistor 388 and the second input end 342 of the comparator 338 may be connected to the second end 354 of the capacitor through the seventh MOS transistor. When the readout circuit is in the phase B state, a voltage V+ 504 of the first input end 344 of the comparator 338 is represented by 0 V as a GND voltage and when a voltage V− 502 of the second input end 342 of the comparator 338 may be represented as $-V_{BE}+I_{PTAT}*t/C$ which is a negative voltage of the voltage $V_{BE}$ which has been stored in the capacitor 336 in the phase A state. As the aforementioned Equation, while the readout circuit is in the phase B state, a time t 506 when the readout value output from the readout circuit is maintained may be represented as $V_{BE}*C*R/\Delta V_{BE}$ like the time 406 in the phase A state. Here, $\Delta V_{BE}$ may mean a base emitter voltage difference between the bipolar junction transistors in the bias circuit.

Figure 6:
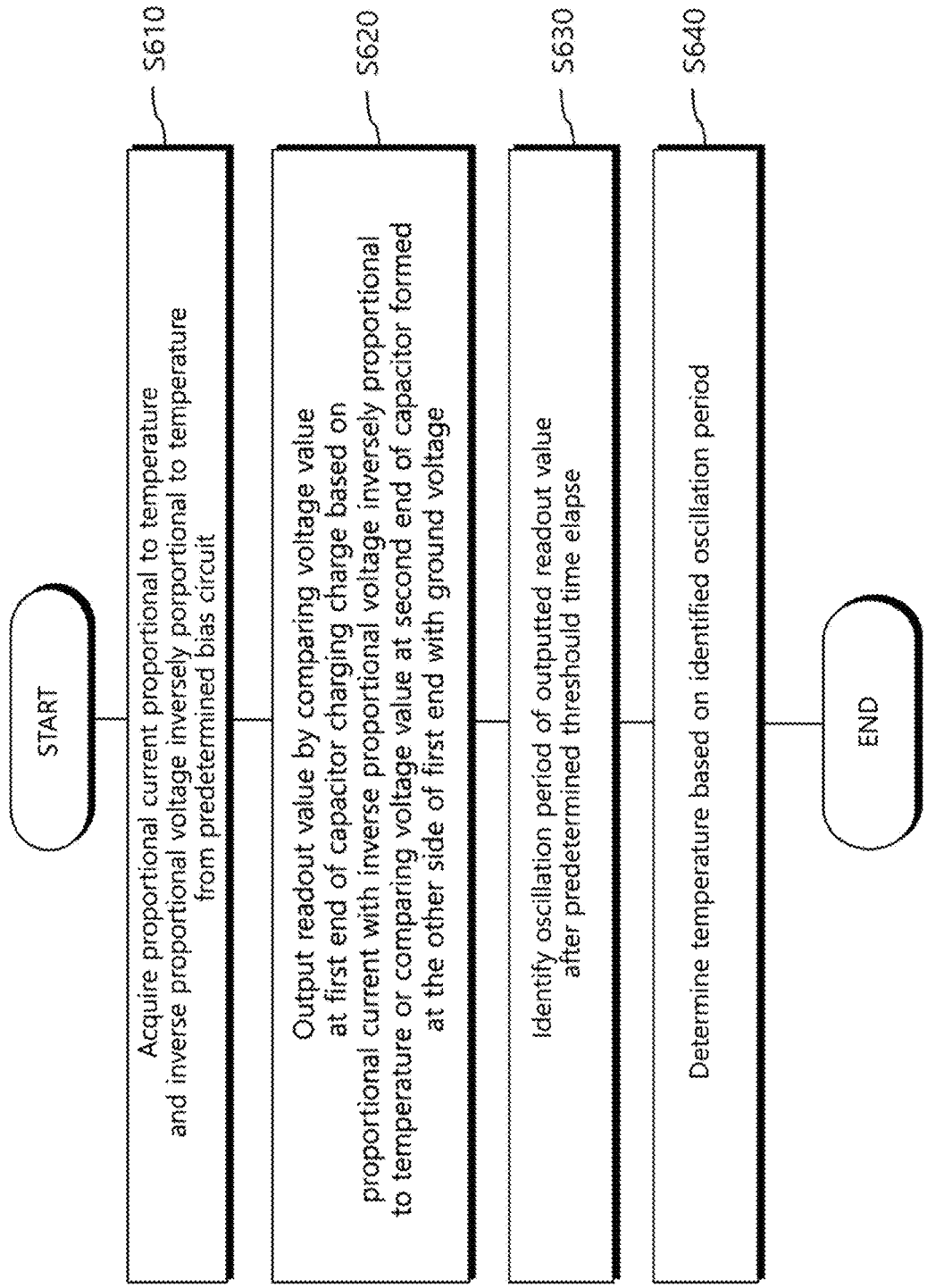
FIG. 6 is a flowchart illustrating an operating method of a CMOS temperature sensor according to an embodiment.

FIG. 6 is a flowchart illustrating an operating method of a CMOS temperature sensor according to an embodiment.

In S610, the CMOS temperature sensor may acquire a proportional current proportional to the temperature from a predetermined bias circuit and an inverse proportional voltage inversely proportional to the temperature. According to an embodiment, the CMOS temperature sensor includes a bias circuit and may acquire a proportional current and an inverse or decreasing at a proportional voltage increasing predetermined ratio according to a temperature variation from the bias circuit.

In S620, the CMOS temperature sensor may output a readout value by comparing a voltage value at the first end of the capacitor charging the charge based on the proportional current with the inverse proportional voltage inversely proportional to the temperature or comparing a voltage value at the second end of the capacitor formed at the other side of the first end with the ground voltage. The CMOS temperature sensor according to an embodiment of the present disclosure may not use the readout value output before a first switching operation of the MOS transistors in the readout circuit starts. In S620, since the operation of the CMOS temperature sensor is the same as those described in FIGS. 3 to 5, the detailed description will be omitted.

In S630, after a predetermined threshold time elapses, the CMOS temperature sensor may identify the oscillation period of the output readout value. For example, the CMOS temperature sensor identifies the oscillation period of the output value of the readout circuit oscillated based on a result of comparing and reading the voltage values of the input ends of the comparator after a predetermined time period elapses from the time when the readout value is output from the readout circuit. However, according to another embodiment, of course, the CMOS temperature sensor may identify immediately the oscillation period of the output value of the readout circuit. In S640, the CMOS temperature sensor may determine the temperature based on the identified oscillation period.

According to an embodiment, the CMOS temperature sensor may determine a first temperature variable based on the oscillation period of the output readout value, the capacity of the capacitor, and the resistance value of the bias resistor in the bias circuit. The CMOS temperature sensor may determine a ratio coefficient for a ratio of an inverse proportional temperature coefficient (inverse proportional temperature coefficient of $V_{CTAT}$) of the inverse proportional voltage inversely proportional linearly to the temperature and a temperature coefficient (e.g., proportional temperature coefficient of $V_{PTAT}$) of a differential voltage according to a base emitter voltage difference of bipolar junction transistors inversely proportional to the temperature in the bias circuit. In addition, the CMOS temperature sensor may determine a second temperature variable based on the first temperature variable and the ratio coefficient and determine the temperature by inputting the second temperature variable to a linear function generated by linearly matching a change range of the second temperature variable with a predetermined absolute temperature range. The process of determining the temperature based on the oscillation period of the output value of the readout circuit by the control unit in the CMOS temperature sensor according to the present disclosure will be described in detail with reference to FIG. 7 to be described below.

Figure 7:
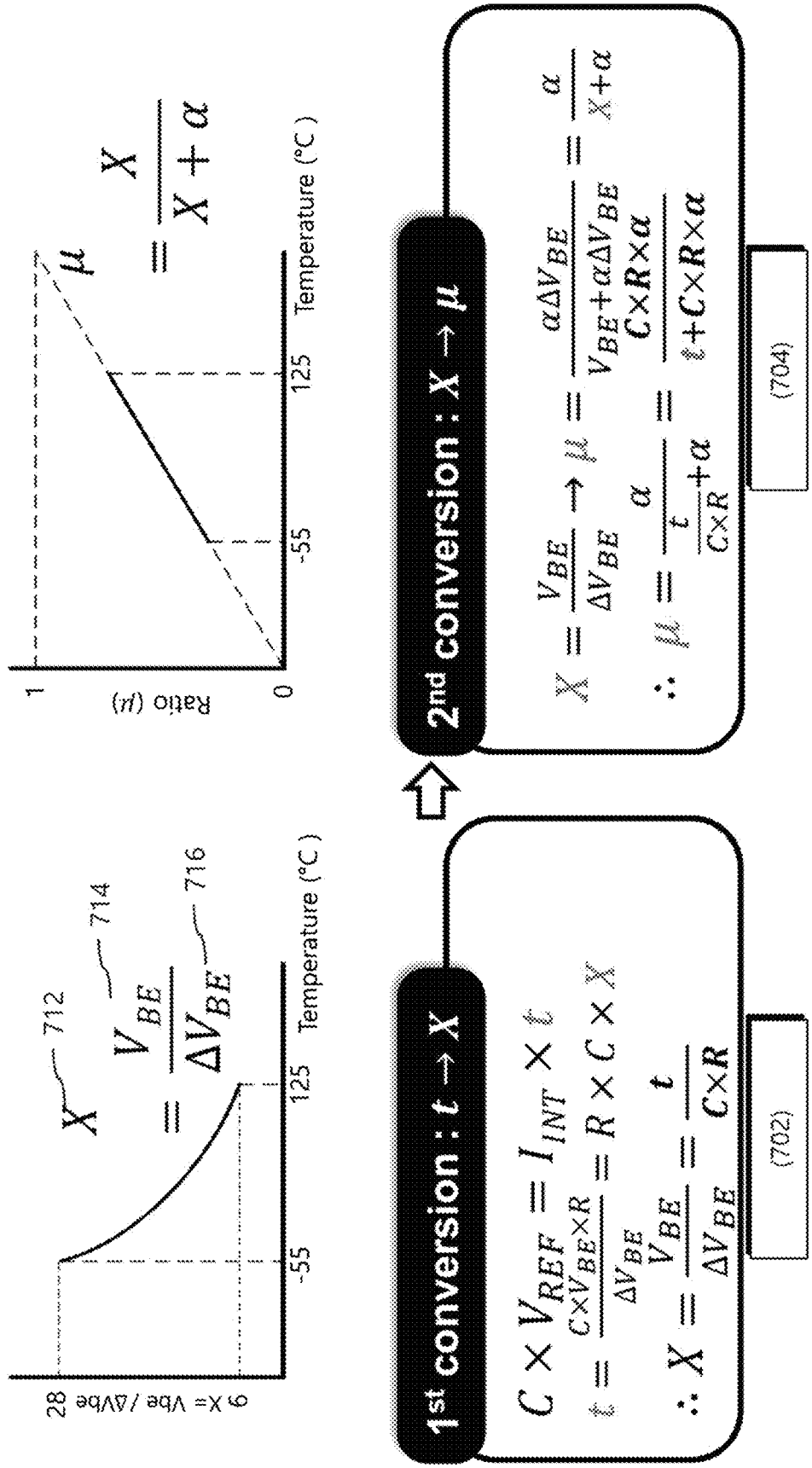
FIG. 7 is a diagram for describing a process in which a CMOS temperature sensor determines a temperature based on an oscillation period of an output value of a readout circuit according to an embodiment.

FIG. 7 is a diagram for describing a process in which a CMOS temperature sensor determines a temperature based on an oscillation cycle of an output value of a readout circuit according to an embodiment.

According to an embodiment, the CMOS temperature sensor may determine a temperature by performing an equation conversion process in two stages. For example, referring to Equation shown in a drawing 702 of FIG. 7, the CMOS temperature sensor may first determine a first temperature variable X 712 using an oscillation period t of the output value of the readout circuit, a capacitor capacity, and a bias resistor R value. X may be defined by a value obtained by dividing an inverse proportional voltage $V_{BE}$ 714 supplied from an inverse proportional voltage supply unit by a difference $\Delta V_{BE}$ 716 between base emitter voltage values of the bipolar junction transistors in the bias circuit.

The CMOS temperature sensor may determine a first temperature variable based on Equation of the above-described drawing 702 and then determine a second temperature variable based on the first temperature variable. For example, referring to a drawing 704 of FIG. 7, the CMOS temperature sensor may determine a second temperature variable m using the first temperature variable and a ratio coefficient a. For example, the CMOS temperature sensor may determine the temperature by inputting the second temperature variable to a linear function generated by linearly matching a change range of the second temperature variable with a predetermined absolute temperature range.

According to an embodiment, the ratio coefficient may be defined by a value obtained by dividing an inverse proportional temperature coefficient of $V_{CTAT}$ by a proportional temperature coefficient of $V_{PTAT}$, as a value required when generating a voltage $V_{REF}$ ($V_{BE}+a*\Delta V_{BE}$) which is not changed according to a temperature by adding a voltage $V_{PTAT}$ ($\Delta V_{BE}$) increasing proportionally as the temperature increases to a voltage $V_{CTAT}(V_{BE})$ inversely proportional to the temperature.

The CMOS temperature sensor may determine a second temperature variable m by matching a change range of the first temperature variable with a change range of a predetermined second temperature variable. According to an embodiment, the second temperature variable m may be defined as a ratio coefficient a/(X+a).

Figure 8:
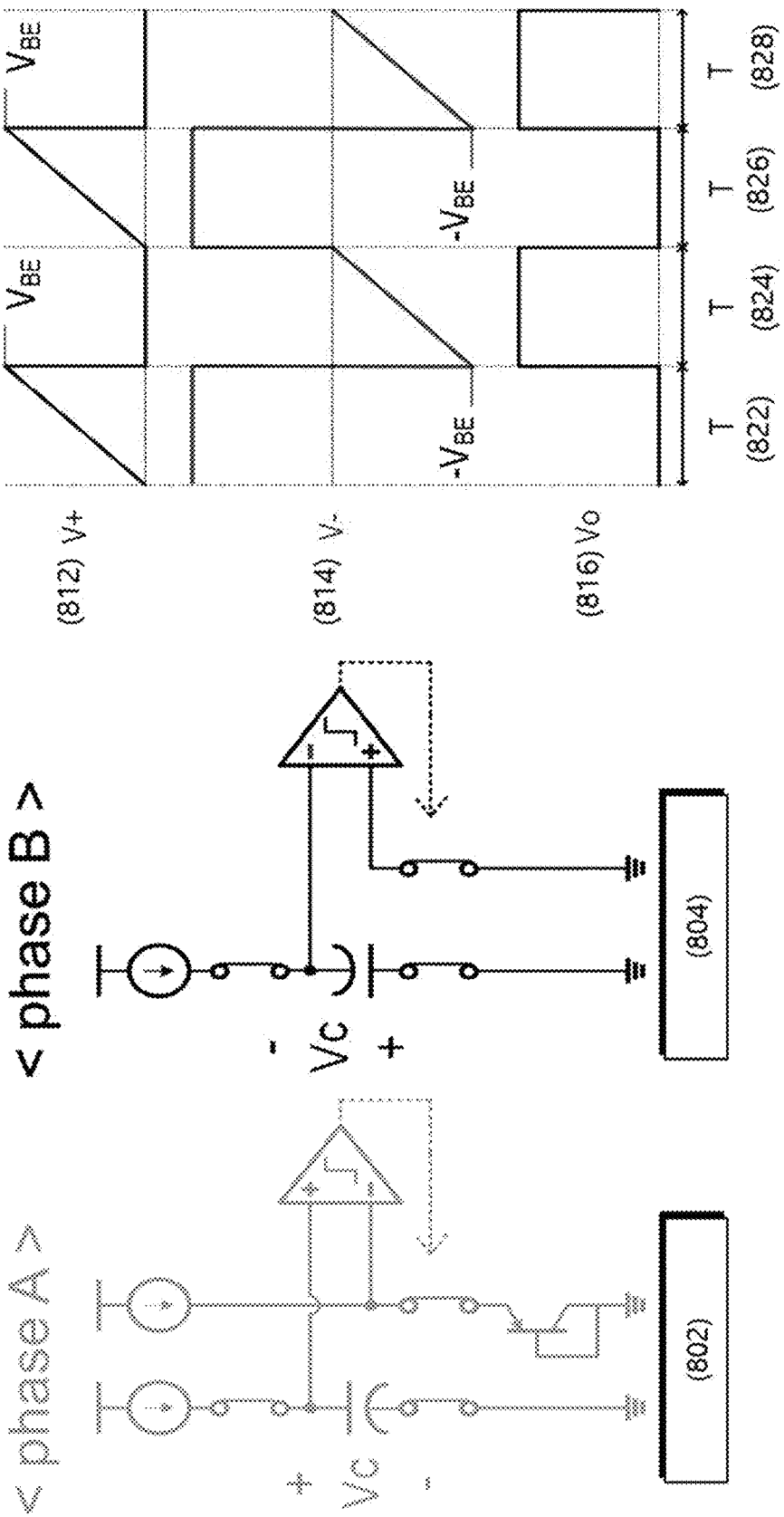
FIG. 8 is a diagram for describing an operation of a CMOS temperature sensor using input voltages of a comparator in a readout circuit and an output value of the readout circuit.

FIG. 8 is a diagram for describing an operation of a CMOS temperature sensor using input voltages of a comparator in a readout circuit and an output value of the readout circuit. Referring to FIG. 8, as the phase A state and the phase B state in the readout circuit are repeated, changes of a voltage V+ 812 of the first input end of the comparator, a voltage V− 814 of the second input end of the comparator, and an output voltage 816 of the readout circuit are illustrated. For example, in a first period 822 in which the readout circuit is in the phase A state and the voltage 812 of the first input end of the comparator is smaller than the voltage 814 of the second input end, the voltage 812 of the first input end may be represented by $I_{PTAT}*t/C$ and the voltage 814 of the second input end may be represented by $V_{BE}$ as described in FIG. 4. Since the voltage 812 of the first input end is the same as the voltage of the second input end when the first period 822 ends, the voltage 812 of the first input end may have a voltage value having a smaller magnitude than the voltage of the second input end while the first period 822 is performed. Therefore, the comparator may maintain the output voltage of the readout value to LOW.

When the voltage 812 of the first input end becomes the same as the voltage $V_{BE}$ of the second input end at the time when the first period 822 ends, the readout circuit may enter the phase B state. When the readout circuit is in the phase B state, the second MOS transistor group is short-circuited and the first MOS transistor group is opened. In this case, as illustrated in FIG. 5, the voltage 812 of the first input end of the comparator may be represented by a ground voltage of 0 V and the voltage 814 of the second input end may be represented by $-V_{BE}+(I_{PTAT}*t)/C$. The voltage 814 of the second input end becomes the same as the ground voltage at the time when the second period 824 ends. While the second period 824 is in progress, the voltage 814 of the second input end is smaller than the voltage 812 of the first input end, so that the comparator may output the output value of the readout circuit to High.

At the time when the second period 824 in which the readout circuit is in the phase B state ends, when the voltage 814 of the second input end becomes the same as the voltage 812 of the first input end, the readout circuit enters the phase A state again and may enter a third period 826 corresponding to the operation of the first period 822. Similarly, when the voltage 812 of the first input end becomes the same as the voltage 814 of the second input end again at the time when the third period 826 ends, the readout circuit enters a fourth period 828 corresponding to the second period 824, and at this time, the readout circuit may be maintained in the phase B state again.

Figure 9:
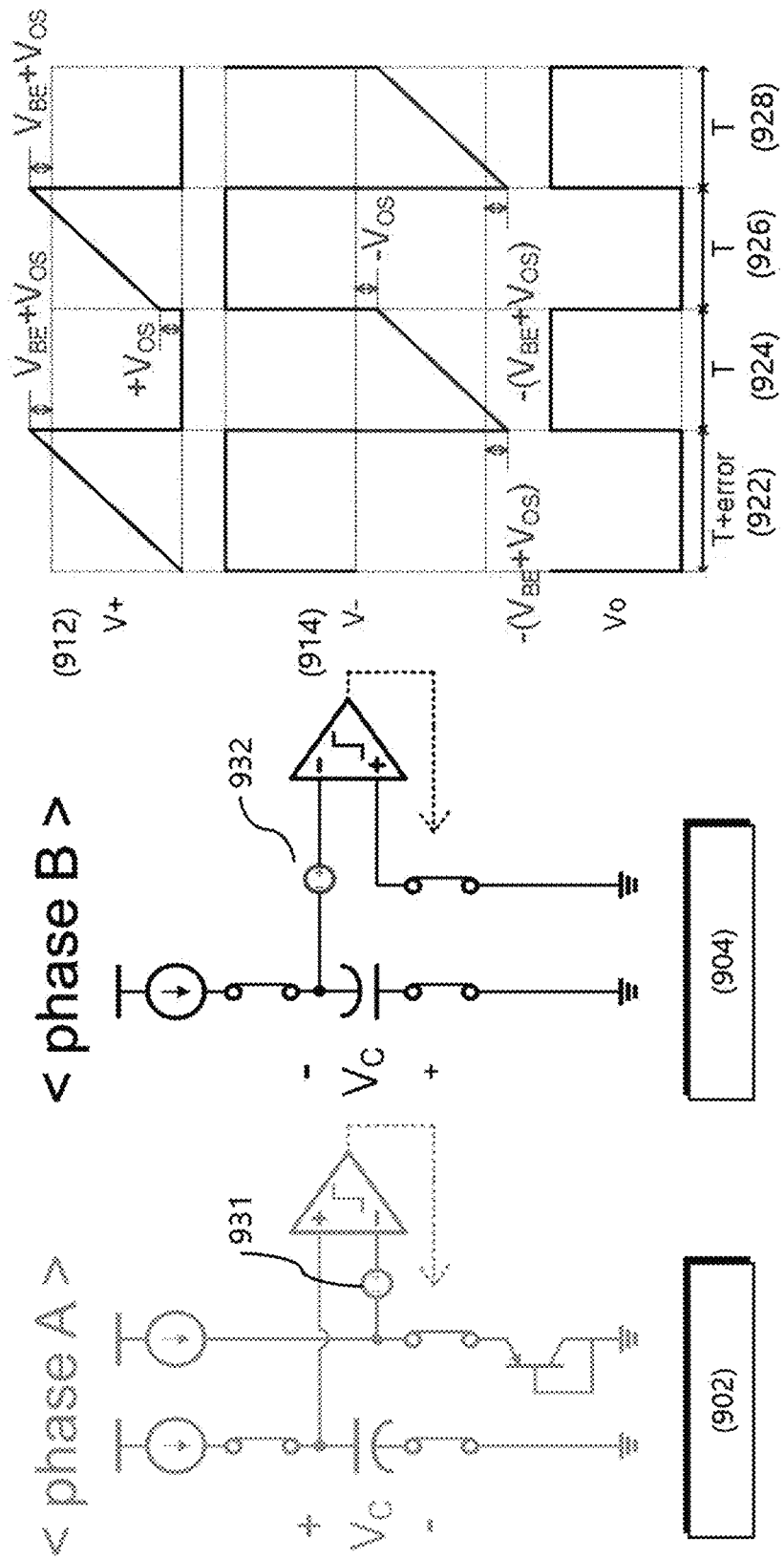
FIG. 9 is a diagram for describing an operation of a CMOS temperature sensor considering an offset voltage in the readout circuit according to an embodiment.

FIG. 9 is a diagram for describing an operation of a CMOS temperature sensor considering an offset voltage in the readout circuit according to an embodiment.

Referring to FIG. 9, unlike the drawings 802 and 804 of FIG. 8, an offset voltage source 931 modeled in the input end of the comparator is illustrated in the drawing 902 and an offset voltage source 932 is illustrated in the drawing 904. According to an embodiment, an offset voltage may be generated due to a mismatch which may appear at the input end voltage of the comparator, and the offset voltage may be modeled as the voltage source 932 as illustrated in FIG. 9.

When the operation of the readout circuit considering the offset voltage is described in a first period 922, a second period 924, a third period 926, and a fourth period 928, in the first period 922, the readout circuit enters the phase A state, the first MOS transistor group is short-circuited, and the second MOS transistor group may be opened. At this time, the voltage 912 of the first input end of the comparator may reach a voltage value obtained by adding an offset voltage $V_{OS}$ to the voltage $V_{BE}$ of the proportional voltage supply unit, unlike FIG. 8. In addition, the voltage 914 of the second input end of the comparator may be maintained to a voltage $V_{BE}+V_{OS}$. Accordingly, in the first period 922, a time (e.g., the first period 922) taken when the voltage 912 of the first input end becomes the same as the voltage 914 of the second input end may increase by a time T+error.

When the voltage 912 of the first input end becomes the same as the voltage 914 of the second input end, the readout circuit enters the phase B state, the first MOS transistor group is opened, and the second MOS transistor group may be short-circuited. In the second period 924, the voltage 912 of the first input end is maintained at the offset voltage $V_{OS}$ other than the ground voltage as illustrated in FIG. 8 and the voltage 914 of the second input end may be represented by $-(V_{BE}+V_{OS})+(I_{PTAT}*t)/C$. However, since the time at the second period 924 ends when the voltage of the second input end reaches $-V_{OS}$ from $-(V_{BE}+V_{OS})$ unlike the first period 922, a time error element due to an offset error does not appear. Similarly, a time T when the third period 926 and the fourth period 928 as well as the second period 924 are in progress may have the same time value as a time T for each readout circuit operation period of FIG. 8 in which the offset voltage does not appear.

Accordingly, the CMOS temperature sensor according to the present disclosure may accurately determine a temperature by analyzing an output value of the readout circuit appearing after a predetermined time (e.g., T+error, 2T+error, 3T+error, etc.) to avoid inaccuracy of the output value of the readout circuit due to the offset voltage.

Figure 10:
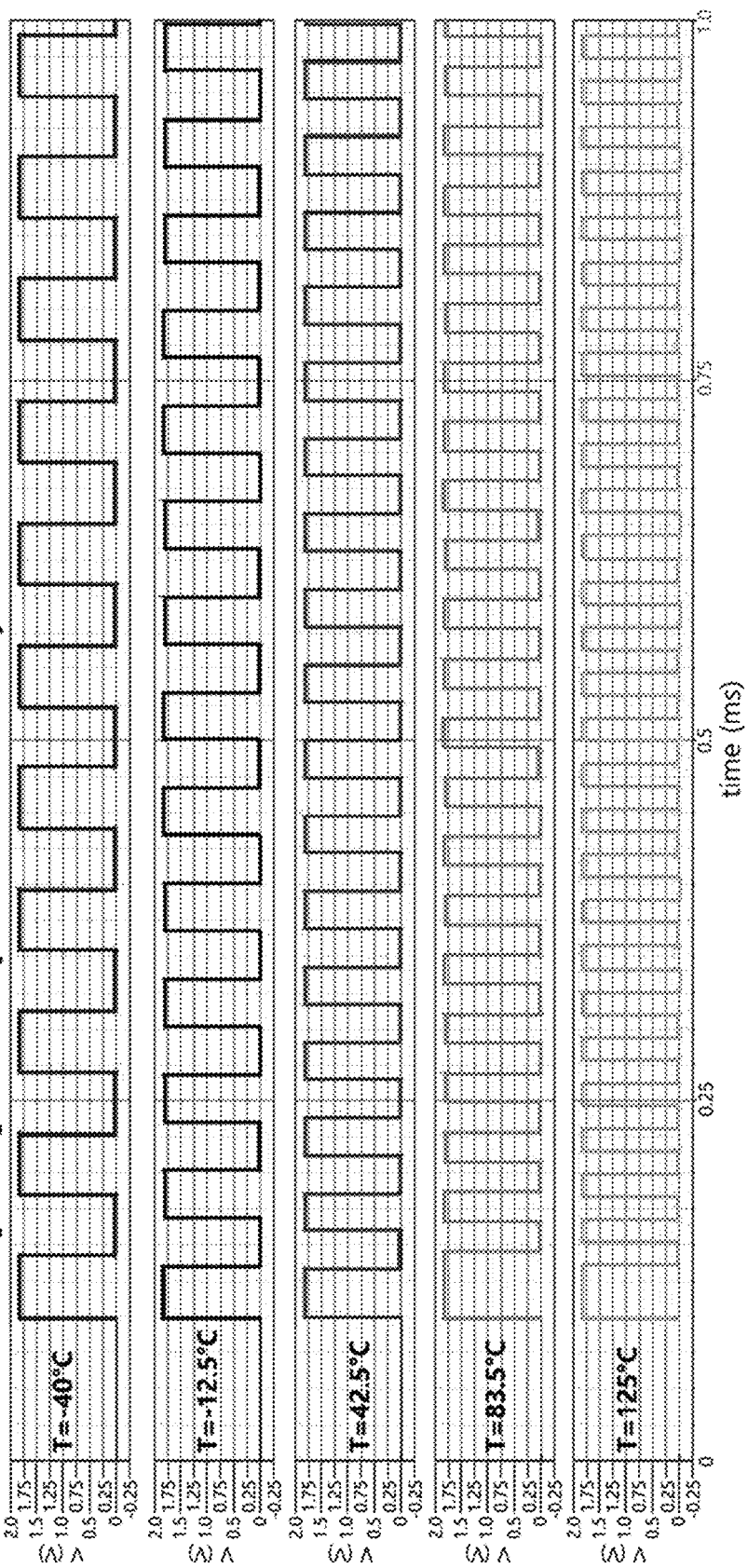
FIG. 10 is a diagram for describing a simulation result for verifying a temperature sensor disclosed according to an embodiment.

FIG. 10 is a diagram for describing a simulation result for verifying a temperature sensor disclosed according to an embodiment.

Referring to FIG. 10, an output in the readout circuit will be described. When an operating temperature of the CMOS temperature sensor including the readout circuit increases, the voltage $V_{BE}$ may decrease and the current $I_{PTAT}$ may increase. Considering this, as the temperature increases, the oscillation period is reduced and the oscillation frequency may be increased. According to an embodiment, the oscillation frequency of the output voltage of the readout circuit between −40° C. and 125° C. may be 20 kHz to 60 kHz. Referring to FIG. 10, it may be observed that as the temperature increases, the oscillation frequency of the output value of the readout circuit increases. The oscillation frequency value may be determined by the size of the capacitor 336 and $I_{PTAT}$ 332 in the temperature sensor, and at about dozens of kHz, a delay time of the comparator itself, which is generally only dozens to hundreds nanoseconds, may be ignored.

Figure 11:
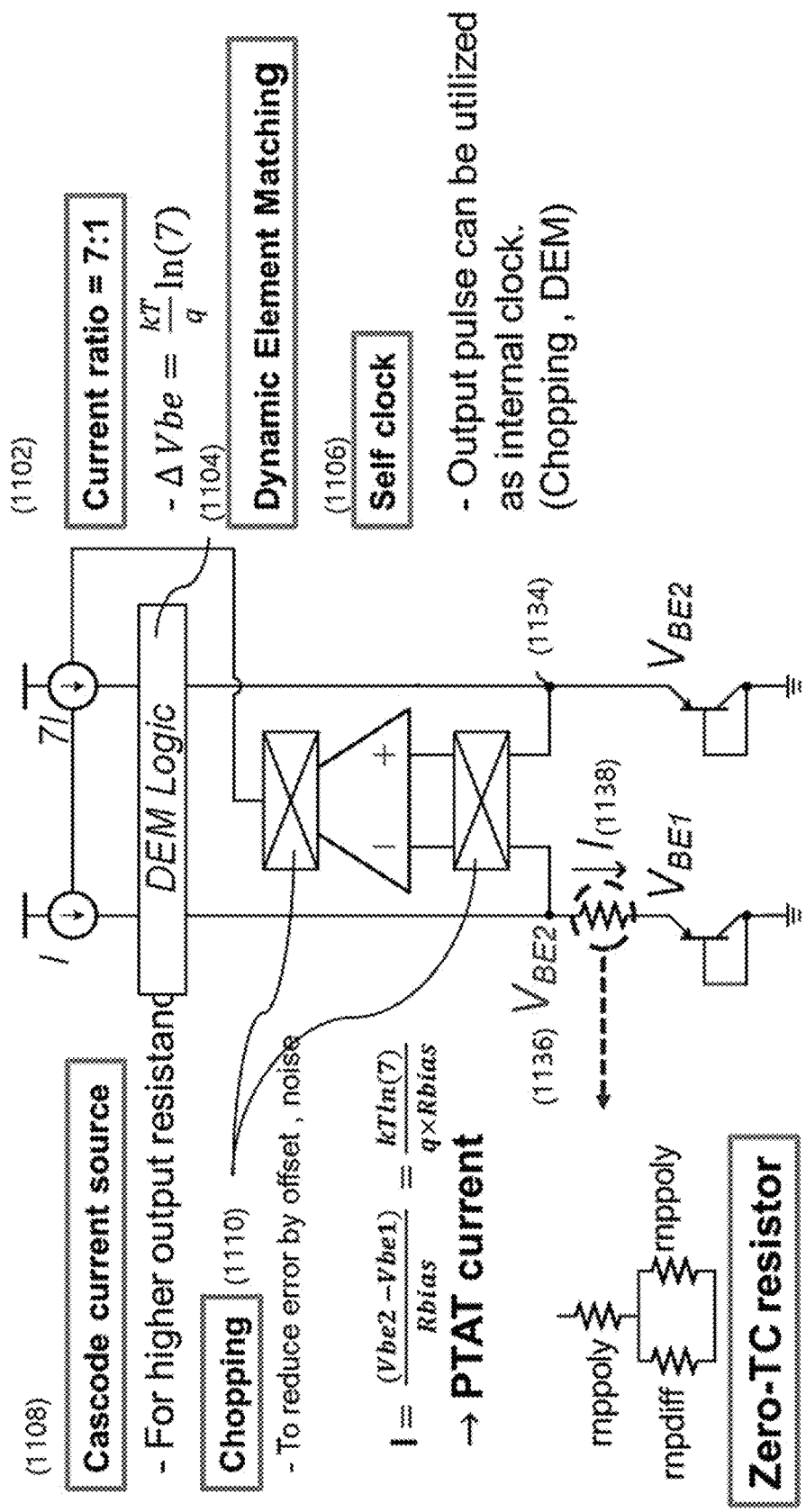
FIG. 11 is a diagram for describing a structure of a bias circuit according to an embodiment.

FIG. 11 is a diagram for describing a structure of a bias circuit according to an embodiment.

According to an embodiment, the CMOS temperature sensor may further include a bias circuit. For example, the CMOS temperature sensor may obtain a proportional current $I_{PTAT}$ proportional to the temperature and an inverse proportional voltage $V_{BE}$ from the bias circuit. According to an embodiment, the bias circuit may include two current sources 1102 having different current sizes. According to an embodiment, a current magnitude ratio of the two current sources may be provided at 7:1. One of the two current sources may be a mirroring current supply source generating by mirroring a current of the other current source.

According to an embodiment, the bias circuit may include a DEM logic module 1104 as an algorithm module for reducing a mismatch due to the mirroring current. According to an embodiment, the CMOS temperature sensor may use a self clock signal 1106 without using an external clock. For example, the CMOS temperature sensor may use the output value of the readout circuit in the CMOS temperature sensor as an internal clock signal to improved power efficiency.

According to an embodiment, the bias circuit may include at least one chopping circuit 1110, a cascode current source 1108, and two bipolar junction transistors. According to an embodiment, the bias circuit uses the cascode current source 1108 to improve current accuracy by using many MOSFET transistors. According to an embodiment, the bias circuit may include an operational amplifier, and the operational amplifier may generate a current $I_{PTAT}$ by equalizing magnitudes of a positive input end voltage and a negative input end voltage when a negative feedback is given. The chopping circuit 1110 may reduce a noise due to offset of the operational amplifier.

For example, an emitter of the bipolar junction transistor in which the base emitter voltage in the bias circuit is $V_{BE}2$ is connected to one end 1134 of the chopping circuit, and when the negative feedback is given to the operational amplifier, $V_{BE}2$ may be applied to the other end 1136 of the chopping circuit. In this case, $I_{PTAT}$ 1138 may be represented as $(V_{BE}2-V_{BE}1)/(Rbias)$. According to an embodiment, the bias resistor in the bias circuit may be configured by designing some of a plurality of resistors in series or some of the plurality of resistors in parallel to offset an electrical characteristic change according to a temperature.

Figure 12:
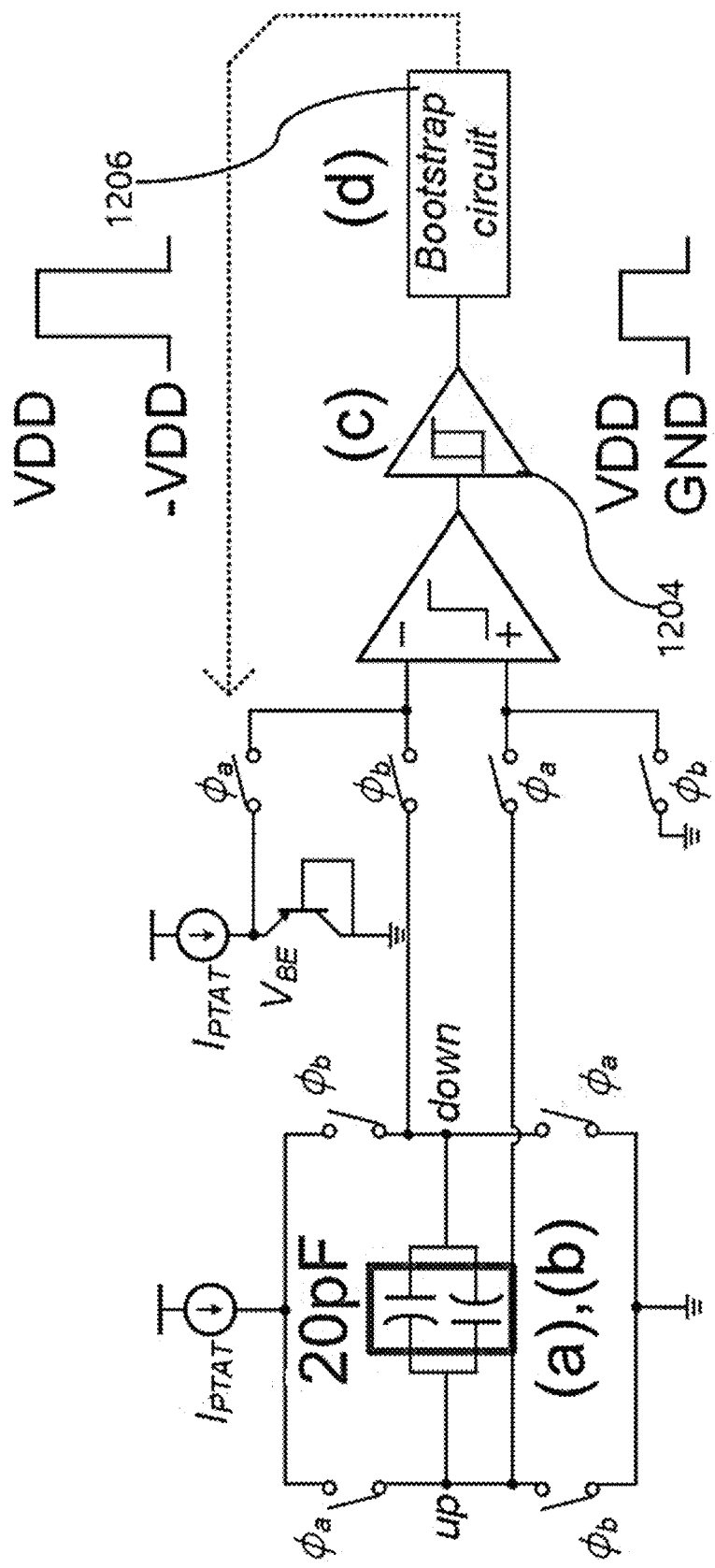
FIG. 12 is a diagram for describing features for improving the performance of a readout circuit according to another embodiment.

FIG. 12 is a diagram for describing features for improving the performance of a reading circuit according to another embodiment.

Referring to FIG. 12, a structure of a CMOS temperature sensor according to another embodiment is illustrated. According to an embodiment, a capacitor in a readout circuit of the CMOS temperature sensor may be provided to have a capacitor capacity of 20 pF or more to solve a charge sharing problem caused by a parasitic capacitance. In addition, according to an embodiment, the capacitor in the readout circuit may be configured by connecting top plates and bottom plates of the plurality of capacitors to each other in parallel in order to solve an error due to the parasitic capacitance generated mainly in the bottom plates of the capacitors.

Further, according to an embodiment, a Schmitt trigger circuit 1204 for reducing the error of the comparator may be further connected to the output end of the readout circuit. According to another embodiment, the CMOS temperature sensor further includes a bootstrap circuit 1206 at the output end of the readout circuit so that the plurality of MOS transistors perform a switching operation even at a negative operational voltage (e.g., $V_{BE}$) to increase a range of the output signal to $V_{DD}$ from $-V_{DD}$.

Figure 13:
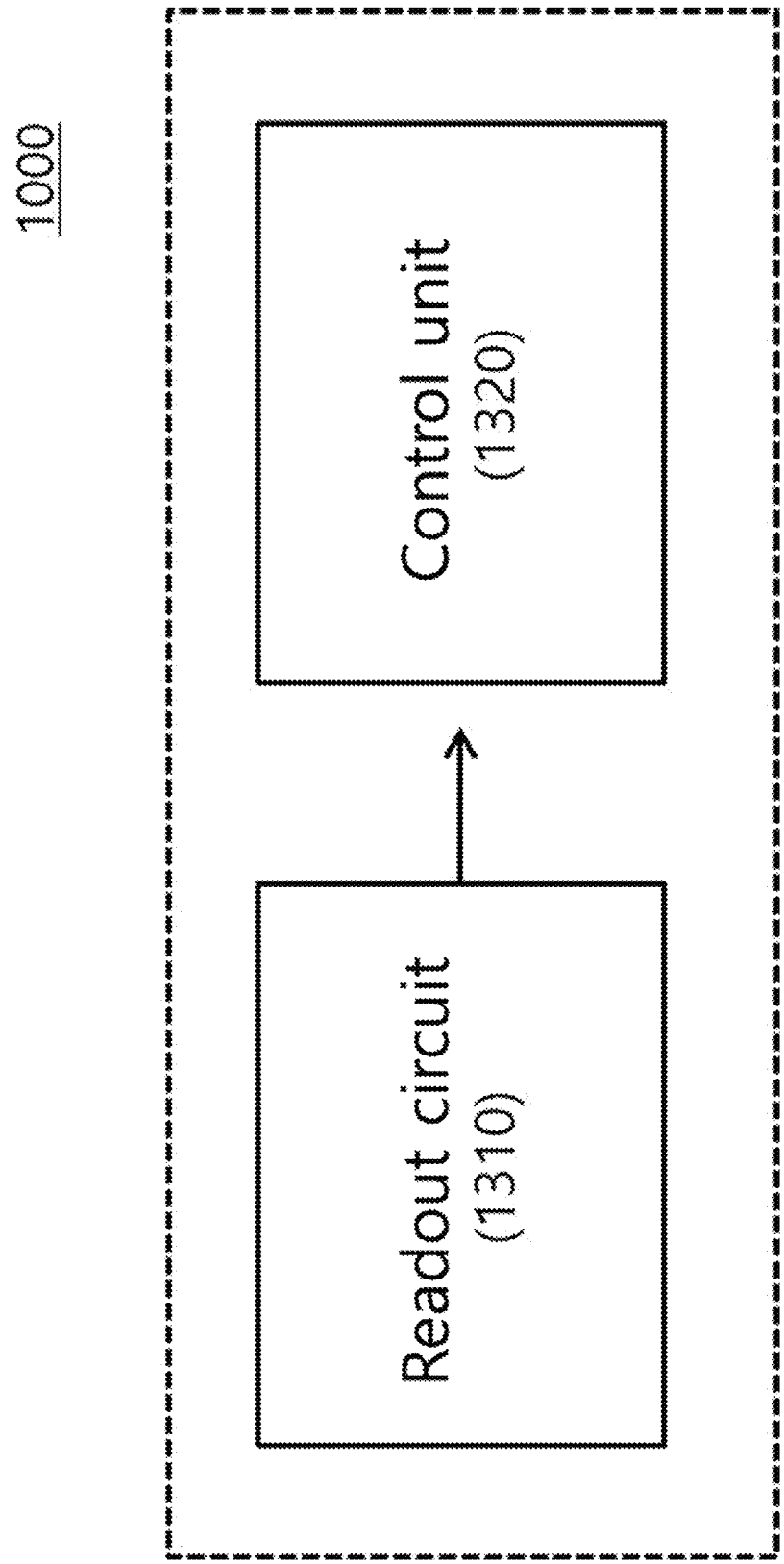
FIG. 13 is a block diagram of a CMOS temperature sensor according to an embodiment.

FIG. 13 is a block diagram of a CMOS temperature sensor according to an embodiment.

Figure 14:
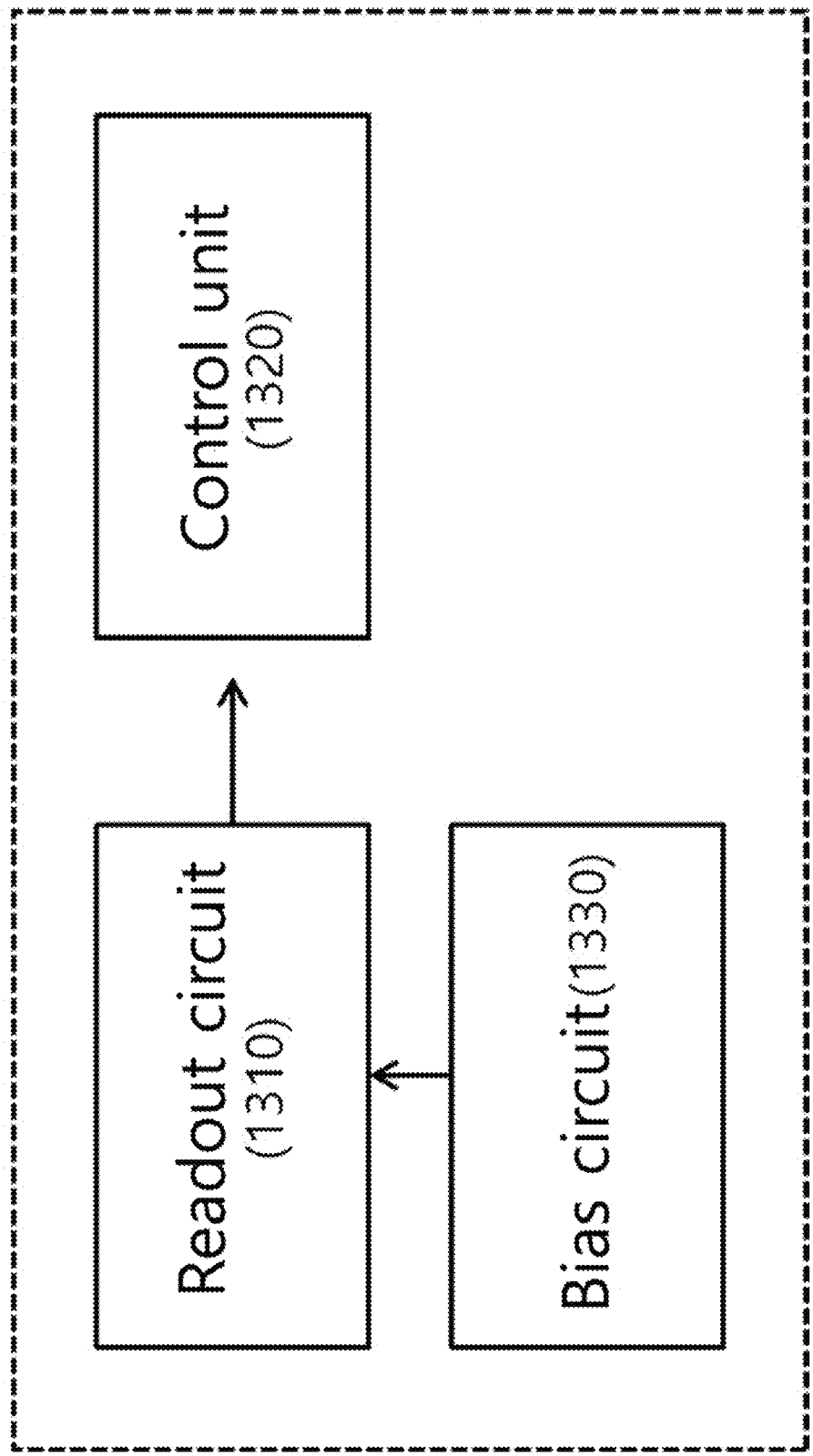
FIG. 14 is a block diagram of a CMOS temperature sensor according to another embodiment.

FIG. 14 is a block diagram of a CMOS temperature sensor according to another embodiment.

According to an embodiment, a CMOS temperature sensor 1000 may include a readout circuit 1310 and a control unit 1320. However, it is not limited to the above-described configuration, and the CMOS temperature sensor may further include a bias circuit 1330 as shown in FIG. 14. Since the configuration included in the readout circuit 1310, the controller 1320, and the bias circuit 1330 may correspond to those described in FIGS. 1 to 12, the detailed description will be omitted.

According to an embodiment, there may be provided a computer readable recording medium for executing the operating method of the CMOS temperature sensor according to the present disclosure on a computer. For example, the operating method of the CMOS temperature sensor performed by executing one or more instructions stored in the memory by the control unit in the CMOS temperature sensor is implemented in the form of a program instruction that may be performed through various computer means to be recorded in a computer readable medium. The computer readable medium may include a program instruction, a data file, and a data structure alone or in combination. The program instructions recorded in the medium may be specially designed and configured for the present disclosure, or may be publicly known to and used by those skilled in the computer software field.

Further, according to an embodiment, there may be provided a computer program device including a recording medium storing a program to perform the operating method of the CMOS temperature sensor.

Examples of the computer readable medium include magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program instructions. Examples of the program instructions include high language codes executable by a computer by using an interpreter and the like, as well as machine language codes created by a compiler.

Some embodiments may be implemented even in the form of a recording medium including instructions executable by a computer such as a program module executed by the computer. The computer readable medium may be any available medium accessible by the computer or includes all of volatile and non-volatile media and removable and irremovable media. Further, the computer readable medium may include both a computer storage medium and a communication medium. The computer storage medium includes all of the volatile and non-volatile and removable and irremovable media implemented by a predetermined method or technology for storing information such as a computer readable command, a data structure, a program module, or other data. The communication medium typically includes a computer readable instruction, a data structure, a program module, other data of a modulated data signal such as a carrier, or other transmission mechanisms and includes a predetermined information transfer medium. In addition, some embodiments may also be implemented as a computer program or computer program product that includes instructions executable by a computer, such as a computer program executed by a computer.

While the embodiments of the present disclosure have been described in detail, it is to be understood that the scope of the present disclosure is not limited thereto, but various modifications and improvement forms of those skilled in the art using a basic concept of the present disclosure defined in the following claims are included in the scope of the present disclosure.

What is claimed is:

1. A CMOS temperature sensor for measuring a temperature comprising:
   a readout circuit that outputs a readout value by comparing a voltage value at a first end of a side of a capacitor charging a charge based on a proportional current proportional to a temperature with an inverse proportional voltage inversely proportional to the temperature or comparing a voltage value at a second end of the capacitor formed at another side of the capacitor from the first end with a ground voltage;
   a control unit that determines a temperature based on an oscillation period of the readout value output from the readout circuit; and
   a bias circuit that supplies the proportional current generated by applying a differential voltage between base emitter voltage values of bipolar junction transistors inversely proportional to the temperature in the bias circuit.

2. The CMOS temperature sensor of claim 1, wherein the capacitor includes a plurality of capacitors connected to each other in parallel by reversing a top plate and a bottom plate of the capacitors.

3. The CMOS temperature sensor of claim 1, wherein a bias resistor is configured by designing some of a plurality of resistors in series or some of the plurality of resistors in parallel to offset an electrical characteristic change according to a temperature.

4. The CMOS temperature sensor of claim 1, wherein the bias circuit comprises
   a plurality of current sources generating currents having different magnitudes;
   a DEM logic module to solve a mismatch between the plurality of current sources;
   a chopping circuit for reducing a noise due to an offset in the bias circuit; and
   a clock circuit for controlling an operation of an electrical device in the bias circuit by itself.

5. The CMOS temperature sensor of claim 1, wherein the control unit determines a first temperature variable based on the oscillation period of the readout value output from the readout circuit, a capacity of the capacitor, and a resistance value of a bias resistor,
   determines a ratio coefficient based on a ratio of an inverse proportional temperature coefficient of the inverse proportional voltage and a proportional temperature coefficient of a differential voltage according to a base emitter voltage difference between the bipolar junction transistors inversely proportional to the temperature in the bias circuit,
   determines a second temperature variable based on the first temperature variable and the ratio coefficient, and
   determines the temperature by inputting the second temperature variable to a linear function generated by linearly matching a change range of the second temperature variable with a predetermined absolute temperature range.

6. The CMOS temperature sensor of claim 5, wherein the control unit determines the temperature based on the oscillation period of the readout value outputted from the readout circuit after a predetermined threshold time elapses.

7. The CMOS temperature sensor of claim 1, wherein the readout circuit comprises a proportional current supply unit for supplying the proportional current; and
an inverse proportional voltage supply unit for supplying the inverse proportional voltage using a mirroring current generated by mirroring the proportional current.

8. The CMOS temperature sensor of claim 7, wherein the readout circuit comprises the capacitor, which repeats an operation of charging up to the inverse proportional voltage or charging up to the ground voltage after reversing a voltage charged in the capacitor according to the oscillation period based on a switching operation of a plurality of MOS transistors; and
a comparator that includes a first input end and a second input end and outputs the readout value by comparing voltages applied to the first input end and the second input end according to the switching operation of the plurality of MOS transistors.

9. The CMOS temperature sensor of claim 8, further comprising:
a Schmitt trigger circuit at the output of the readout circuit to improve readout accuracy of the comparator.

10. The CMOS temperature sensor of claim 8, further comprising:
a bootstrap circuit at the output of the readout circuit so that the plurality of MOS transistors perform a switching operation at a negative operational voltage.

11. The CMOS temperature sensor of claim 8, wherein the comparator outputs a first readout value corresponding to a LOW signal when the voltage of the first input end is smaller than the voltage of the second input end and outputs a second readout value corresponding to a HIGH signal when the voltage of the first input end is larger than the voltage of the second input end.

12. The CMOS temperature sensor of claim 11, wherein when the first readout value is output from the readout circuit, based on the switching operation of the plurality of MOS transistors, the first input end is connected to the first end of the capacitor and the second input end is connected to the inverse proportional voltage supply unit.

13. The CMOS temperature sensor of claim 11, wherein when the second readout value is output from the readout circuit, based on the switching operation of the plurality of MOS transistors, the first input end is connected to the ground voltage and the second input end is connected to the second end of the capacitor.

14. The CMOS temperature sensor of claim 11, wherein the readout circuit comprises
a first MOS transistor group that includes a first MOS transistor connecting the proportional current supply unit and the first end when the first readout value is output from the readout circuit, a second MOS transistor connecting the second end and the ground voltage when the first readout value is output from the readout circuit, a third MOS transistor connecting the first end and the first input end when the first readout value is output from the readout circuit, and a fourth MOS transistor connecting the second input end and the inverse proportional voltage supply unit when the first readout value is output from the readout circuit; and
a second MOS transistor group that includes a fifth MOS transistor connecting the proportional current supply unit and the second end when the second readout value is output from the readout circuit, a sixth MOS transistor connecting the first end and the ground voltage when the second readout value is output from the readout circuit, a seventh MOS transistor connecting the second end and the second input end when the second readout value is output from the readout circuit, and an eighth MOS transistor connecting the first input end and the ground voltage when the second readout value is output from the readout circuit.

15. A method for measuring a temperature by a CMOS temperature sensor comprising the steps of:
acquiring a proportional current proportional to a temperature and an inverse proportional voltage inversely proportional to the temperature from a predetermined bias circuit;
outputting a readout value by comparing a voltage value at a first end of a side of a capacitor charging a charge based on the proportional current with the inverse proportional voltage inversely proportional to the temperature or comparing a voltage value at a second end of the capacitor formed at another side of the capacitor from the first end with a ground voltage;
identifying an oscillation period of the outputted readout value after a predetermined threshold time elapses; and
determining a temperature based on the identified oscillation period.

16. A computer readable recording medium in which a program is stored to perform a method for measuring a temperature by a CMOS temperature sensor, the method comprising:
acquiring a proportional current proportional to a temperature and an inverse proportional voltage inversely proportional to the temperature from a predetermined bias circuit;
outputting a readout value by comparing a voltage value at a first end of a side of a capacitor charging a charge based on the proportional current with an inverse proportional voltage inversely proportional to the temperature or comparing a voltage value at a second end of the capacitor formed at another side of the capacitor from the first end with a ground voltage;
identifying an oscillation period of the outputted readout value after a predetermined threshold time elapses; and
determining a temperature based on the identified oscillation period.

* * * * *